United States Patent [19]

Vaughn et al.

[11] Patent Number: 5,168,552
[45] Date of Patent: Dec. 1, 1992

[54] COLOR SEPARATION IN INK JET COLOR GRAPHICS PRINTING

[75] Inventors: Ronald J. Vaughn; John R. Matthews, both of Vancouver, Wash.

[73] Assignee: Hewlett-Packard Company, Palo Alto, Calif.

[21] Appl. No.: 784,498

[22] Filed: Oct. 29, 1991

[51] Int. Cl.$^5$ ............................................. G06K 15/00
[52] U.S. Cl. .................................... 315/109; 315/115
[58] Field of Search ............... 395/101, 108, 109, 114, 395/115, 116, 117; 340/723, 750, 701, 703, 704; 358/28, 29, 31, 32, 79, 80, 444, 462, 467, 296

[56] References Cited

U.S. PATENT DOCUMENTS

| | | | |
|---|---|---|---|
| 4,814,891 | 3/1989 | Uchiyama et al. | 358/296 |
| 4,896,275 | 1/1990 | Jackson | 364/519 |
| 4,953,013 | 8/1990 | Tsuji et al. | 358/80 |
| 4,959,790 | 9/1990 | Morga | 395/109 |
| 4,967,283 | 10/1990 | Uchiyama et al. | 358/296 |
| 5,012,257 | 8/1991 | Lowe et al. | 364/1.1 |

*Primary Examiner*—Arthur G. Evans

[57] ABSTRACT

In liquid-ink color graphics printing, true black ink is preferred over composite black wherever possible, but poor print quality results from printing black ink too close to color ink, due to limitations in present ink chemistry. A method of processing color bit-map graphics data in a four-color liquid-ink printing system, so as to maximize use of black ink while maintaining a minimum spacing between black and color inks (FIGS. 2-4) is disclosed. The input data is stored in CMY bit-map color planes (54,56,58). Preliminarily, data representing composite black is moved from the color planes into a K plane (60) for printing by a true black pen. The data is examined (66) to detect any black ink within the minimum spacing from color ink. The examination is expedited by partitioning the data into blocks (FIG. 8A), and indicating each block as a color block, a black block, or a white block (FIG. 11). These indications are conveniently stored in a color table (62) and a black table (64), in which each block of data is represented by a single bit (FIGS. 8-9). Tests for black adjacent color are conducted at the block level, i.e., in the tables (FIGS. 15-17), rather than at the individual bit level. Where a black block is detected adjacent a color block, the spacing violation is corrected by moving the corresponding block of data from the K plane back into the color planes (166) for printing as composite black. After such correction, the data is re-checked (174) to detect any new violation(s) resulting from the correction. The process repeated until no minimum spacing violations are found.

20 Claims, 17 Drawing Sheets

Valid Configuration

Valid Configuration

Valid Configuration

FIG. 5

Invalid Configuration

FIG. 6

Invalid Configuration

FIG. 7

Invalid Configuration

|   | 1 | 2 | 3 | 4 | 5 | 6 | 7 | 8 |
|---|---|---|---|---|---|---|---|---|
| 1 | 00000000<br>00000000<br>00011111<br>00011111<br>00011111<br>00000000<br>00000000<br>00000000 | 00000000<br>00000000<br>11100000<br>11100000<br>11100000<br>11100000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000111<br>00000111 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 |
| 2 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 11000000<br>11000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 |
| 3 | 00000000<br>00000000<br>00000000<br>00000000<br>00000000<br>00000000<br>00000000<br>00000000<br>00000000 | 00000000<br>00001000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000<br>00000000 | 00000000<br>00001111<br>00000000<br>00000000<br>00000000<br>00000000<br>00000000<br>00000000<br>00000000 | 00000110<br>00000110<br>00000110<br>00000000<br>00000000<br>00000000<br>00000000<br>00000000<br>00000000 | 00000000<br>00000000<br>00000000<br>00000000<br>00000000<br>00000000<br>00000000<br>00000000<br>00000000 |

C OR M OR Y Planes

Corresponding color table bytes

FIG. 8B

|   | 1 | 2 | 3 | 4 | 5 | 6 | 7 | 8 |
|---|---|---|---|---|---|---|---|---|
| 1 | 00000000<br>00000000<br>00000000<br>00000000<br>00000000<br>00000000<br>00000000<br>00000000 | 00000000<br>00000000<br>00001111<br>00000000<br>00000000<br>00000000<br>00000000<br>00000000 | 00000000<br>00000000<br>11111111<br>00000000<br>00000000<br>00000000<br>00000000<br>00000000 | 00000000<br>00000000<br>11110000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 |
| 2 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000011<br>00000011 | 00000000<br>00000000<br>00000000<br>00000000<br>00000000<br>00000000<br>11100000<br>11100000 |
| 3 | 00000000<br>00000000<br>00000000<br>00000000<br>00000000<br>00000000<br>00000000<br>00000000 | 00000000<br>00111000<br>00111100<br>00111100<br>00000000<br>00001100<br>00111100<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000011<br>00000011<br>00000000<br>00000000<br>00000000<br>00000000<br>00000000<br>00000000 | 11100000<br>11100000<br>00000000<br>00000000<br>00000000<br>00000000<br>00000000<br>00000000 |

K Plane

Corresponding black table bytes

Color table

Black table

Color table

Color table with neighbor bits turned on

Coressponding Black table

Resulting mask after ANDing black table with 01110111 pattern

Black table    Color table    Image

```
00000000     00000000
00000000     00000000
00010000     00000000
00010000     00000000
00010000     00000000
00010000     00000000
00000000     00010000
00000000     00010000
00000000     00010000
00000000     00010000
00000000     00010000
00000000     00010000
00000000     00000000
00000000     00000000
00000000     00000000
00000000     00000000
```

Black table     Color table     Image

| | | |
|---|---|---|
| 00000000 | 00000000 | |
| 00000000 | 00000000 | |
| 00000000 | 00010000 | |
| 00000000 | 00010000 | |
| 00000000 | 00010000 | |
| 00000000 | 00010000 | |
| 00000000 | 00010000 | |
| 00000000 | 00010000 | |
| 00000000 | 00010000 | |
| 00000000 | 00010000 | |
| 00000000 | 00010000 | |
| 00000000 | 00010000 | |
| 00000000 | 00000000 | |
| 00000000 | 00000000 | |
| 00000000 | 00000000 | |
| 00000000 | 00000000 | |
| Black table | Color table | Image |
| Fig. 21A | Fig. 21B | Fig. 21C |
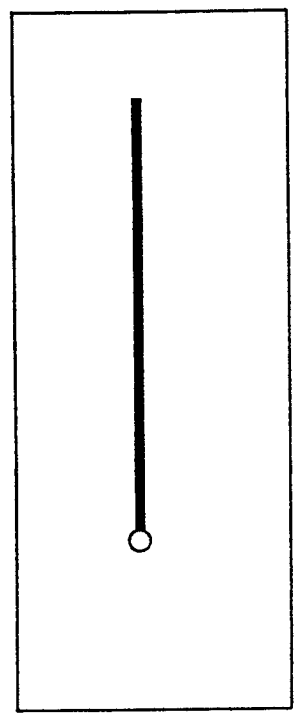

COLOR SEPARATION IN INK JET COLOR GRAPHICS PRINTING

BACKGROUND OF THE INVENTION

This invention relates to the field of liquid ink printing systems, for example ink jet printing systems, and, more particularly, to methods for improving resolution and print quality in four-color ink jet printing systems.

Known ink jet color printing systems use a three-color, for example, Cyan, Magenta and Yellow ("CMY") print head or "pen". All three colors are combined to form composite black (also called "process black") when black is needed. It is preferable, however, to print with (true) black rather than composite black for the following reasons:

1. Black looks better than composite black. Because composite black is composed of three colors, it often has a colored tint to it. It might appear, for example, as green-black, or blue-black. Also, the print quality of composite black varies with paper type, temperature and humidity.

2. In a typical computer system, print data is sent from the host computer to the printer to control the printing of each of the four colors, CMYK, where K represents black (to avoid confusion with the color blue). If an area on a page is printed with composite black, information must be sent to the printer for the CMY inks. If the same area is printed with a black pen (true black), only data for the K ink must be sent. So use of the black pen represents a potential three-to-one reduction in data transmission between the host and the printer.

3. When printing composite black, the color pen must make three passes over the same region, the first pass putting down cyan ink, the second magenta and lastly yellow. If the same region is printed with the black pen, the black pen needs to make only one pass over the region to put down black ink. This represents a significant improvement in printing speed.

Some ink jet printers employ both a color pen and a black pen, but not for use at the same time. In other words, only one or the other pen may be used in the printer at one time. Commercial examples are the Hewlett-Packard DeskWriter C ™ and DeskJet 500 C ™. Because only one pen can be used at a time, a page is either color or black, but not a mix of color and black on the same page. The user must manually swap pens before a page prints if the wrong pen is in the printer. When the color pen is in use, areas that should be black are printed using composite black. This compromises print quality and printing speed, for the reasons stated above.

Four-color printers are those having the three primary colors plus black (CMYK) available for use within a single page. Known four-color (CMYK) ink jet printers, however, have limited resolution and must print on special glossy paper. For example, the Hewlett-Packard PaintJet XL ™ contains four print heads, one each for CMY and K. While that printer does not have to use composite black, its resolution is only 180 dots per inch (DPI). The Kodak DOCONIX Color 4 Printer also contains four print heads for CMYK, only at 192 DPI. The Sharp JX-730 Color Ink Jet Printer is another four color printer that is 216 DPI. Both the Kodak and Sharp printers can print black adjacent to color, but again, at much lower resolution and only on special paper.

What is needed is a liquid ink printing system that allows mixing true black and color inks within a printed page and provides for high resolution printing on regular non-glossy paper. New inks are being developed for printing at high resolution, for example 300 DPI (dots per inch) on plain paper, i.e. a non-glossy paper such as bond paper used in a typewriter. Due to ink chemistry limitations, however, the color and black inks cannot touch on the page, and in fact cannot come within a minimum distance of each other on the page. When the inks do come within the minimum distance, the color ink draws the dye out of the black ink, causing the black ink to lighten. This lightening of the black ink on the page yields unacceptable print quality, and must be avoided. Accordingly, a need remains for maintaining a predetermined minimum spacing between black and color inks on a printed page.

One approach to maintaining the minimum spacing required between color and black inks would be to examine each color dot on the page and then see if any of the surrounding dots within delta are black, and if they are, convert them to process black. Such a method is not practical using present technology, for the following reasons. There are approximately eight million dots on an 8.5" by 11" page. For each dot, there are 138 surrounding dots within the minimum spacing-delta (See FIG. 1), each of which must be examined. Also, once a dot is converted from black to composite black it is made of CMY (color) inks. Therefore, the algorithm must examine this new composited black dot's surrounding 138 dots to see if any are made of K ink. These procedures would easily require checking hundreds of millions or even billions of dots per page. The processing time would be excessive and, therefore, such an approach is not practical.

SUMMARY OF THE INVENTION

An object of the present invention, therefore, is to allow mixing color and true black printing within a single printed page at high resolution.

Another object is to increase resolution in four-color liquid ink printing on plain non-glossy paper.

Yet another object is to maximize use of true black ink rather than composite black ink in a four-color (CMYK) printing system, while maintaining a predetermined minimum spacing between true black ink and color ink to preserve print quality.

A further object is to compensate for pen misalignment in a two-pen four-color printing system.

Another object is to speed processing of bit-map color plane data to improve printing speed in a color printing system.

Another object is to design and implement a very high speed strategy for modifying bit-map color plane data so as to maximize use of true black ink while maintaining a minimum spacing between black ink and color ink, all without unduly slowing the printing process.

Yet another object of the invention is to allow users to mix color and black on the same printed page. For example, to allow users to print a business letter with a color bar-chart in the middle of a page of text. The black will be from the black pen; the colors from the color pen.

The method initially separates data that represents black from data that represents color. Data that represents black is moved into a "K plane" from the CMY planes. In a four-color ink jet printer, the CMY planes control their respective colors in the color pen, and the K plane controls the K pen.

In general, the present method calls for first identifying color graphics data in the color (CMY) planes that represents process black (i.e. the corresponding bits are turned on in all three CMY planes); and replacing that data with data in the K plane. This is done in a manner that maintains a predetermined minimum spacing-delta-between K plane bits and color plane bits. Initially, composite black data is moved from the CMY planes to the K plane, thus changing it from representing composite black to representing (true) black. But this cannot be done blindly, as the new K plane data in some cases would violate the minimum spacing restriction. In such cases, composite black must be used. So the method next detects and corrects minimum spacing violations. The next step is to re-check the data to detect new spacing violations resulting from the corrections, etc. This re-checking may be implemented recursively, though it need not necessarily be done in that manner. Additional details for carrying out these methods at high speed, to maximize printing throughput, are disclosed.

The challenge in performing the needed color separation is to overcome the overwhelming number of bits in the bit planes that must be examined. This invention first compresses the data into eight dot by eight dot blocks of data. Each of these blocks is on a byte boundary, allowing the algorithm to look at eight dots at a time using single machine instructions. Furthermore, each $8 \times 8$ block is represented in either a color table or a black table by just one bit. Byte operations on the color or black tables take into account 512 dots on the page in one machine instruction (each of the eight bits in a byte from the table represents 64 dots from the original $8 \times 8$ block. $64 \times 8 = 512$). Compressing the original CMY planes (which are approximately 1 Megabyte each) into the color and black tables (which are 16 Kilobytes each) allows the color separation technique to quickly determine where K ink is next to CMY ink. When a color block is adjacent to a black block, the data in the black block is moved from the K plane back to the CMY planes. The process is complete when there are no black blocks adjacent to color blocks.

The method proceeds with examining the true black data and the color data, to detect data representing black dots within a predetermined minimum spacing from color dots. If such data is detected, it is corrected by re-designating the offending black data as composite black data for printing in color ink. This new color data may be too close to black data, however. So the method further calls for repeating the examining and re-designating steps until no black dots are detected within the predetermined minimum spacing from color dots. After this processing is completed, printing the data includes printing the true black data using black ink, and printing the color data, including the composite black bits, using color ink, thereby maintaining at least the minimum spacing between black dots and color dots on the printed page.

In greater detail, the step of examining the data is done expeditiously by first selecting a block size equal to at least the minimum spacing in both vertical and horizontal dimensions. Next is partitioning the input data to define a series of blocks of the selected block size. Each one of the series of blocks is designated as one of color, black or white. Having done so, we examine the block designations to detect black blocks adjacent color blocks. Where this occurs, the detected black blocks ae re-designated as color blocks. These steps are repeated until no black blocks are detected adjacent color blocks, thereby ensuring at least the minimum spacing between color data and black data. Thereafter, printing the black blocks using black ink and printing the color blocks using color inks completes the printing process. The processed data can of course be stored to a file or otherwise transferred, for example, for deferred or remote printing operations.

The designations of each block as color, white or black appear in a color table and a black table. The black table has a series of bits, each black table bit corresponding to a respective one of the K plane blocks, and indicating by its binary state whether or not the corresponding K plane block is a black block. Similarly, the color table has a series of bits, each color table bit corresponding to a respective one of the color plane blocks and indicating whether or not the corresponding color plane block is a color block. These steps provide for examining the data implicitly by examining the color table and black table entries.

For each on bit in the color table, representing a color block, the method calls for examining adjacent bits in the black table as follows. First, testing a corresponding black table byte to detect an indication of a black block to the left or right of the color table bit, thereby indirectly detecting a black block adjacent the color block. The method further includes testing black table bytes directly above and below the corresponding black table byte detect any adjacent on bits indicating adjacent black blocks. Diagonally adjacent locations in the black table are tested as well.

The invention thus includes methods of processing the graphics input data for output at high resolution with adequate color separation. The resulting output data may be used to drive a CRT or other color display device, or to control a liquid-ink printer as is illustrated in the preferred embodiment. The new methodology is useful in any output or rendering application in which separation of one "color" (black in the example) from other colors by at least a minimum spacing is desired.

The foregoing and other objects, features and advantages of the invention will become more readily apparent from the following detailed description of a preferred embodiment which proceeds with reference to the drawings.

BRIEF DESCRIPTION OF THE DRAWINGS

FIGS. 5–7 illustrate examples of invalid configurations of ink dots applied to a substrate in that, in each example, at least one color or composite black dot is located less than the minimum spacing from a black dot.

FIG. 8A illustrates a portion of a combined color plane which is partitioned to form three rows by eight columns of blocks, each block consisting of eight bytes of data.

FIG. 8B illustrates a portion of a color table in which each bit corresponds to a respective one of the data blocks of FIG. 8A and indicates whether or not the corresponding block has any color bits ON.

FIG. 9A illustrates a K (black) plane which is partitioned to form three rows by eight columns of blocks in the same manner as the color plane of FIG. 8A.

FIG. 9B illustrates a portion of a black table in which each bit corresponds to a respective one of the data blocks of FIG. 9A and indicates whether or not the corresponding block has any K bits ON.

FIGS. 12A & 12B illustrate a portion of a color table in which one bit is ON, and identifies the pertinent surrounding bits in the corresponding black table.

FIG. 13A is a portion of a color table with two bits ON.

FIG. 13B is the color table of FIG. 13A with neighbor bits turned ON.

FIG. 13C is a portion of a black table corresponding to FIGS. 13A and 13B.

FIG. 13D shows the resulting mask after logically ANDing the black table of FIG. 13C with the mask of FIG. 13B.

FIG. 14A shows a portion of a color table in which the leftmost bit of one byte is ON.

FIG. 14B is a portion of a black table corresponding to the color table of FIG. 14A and indicating by 1's the bit adjacent the ON bit of FIG. 14A.

FIG. 14C is a portion of a color table in which the rightmost bit of a selected byte is ON.

FIG. 14D is a portion of a black table corresponding to the color table of FIG. 14C and indicating by 1's the bits adjacent the ON bit of FIG. 14C.

FIGS. 19A-C, 20A-C, 21A-C illustrate operation of the invention as applied to a specific example of a graphics image.

DETAILED DESCRIPTION OF THE PREFERRED EMBODIMENT

A. Introduction and Nomenclature

Figure 1:
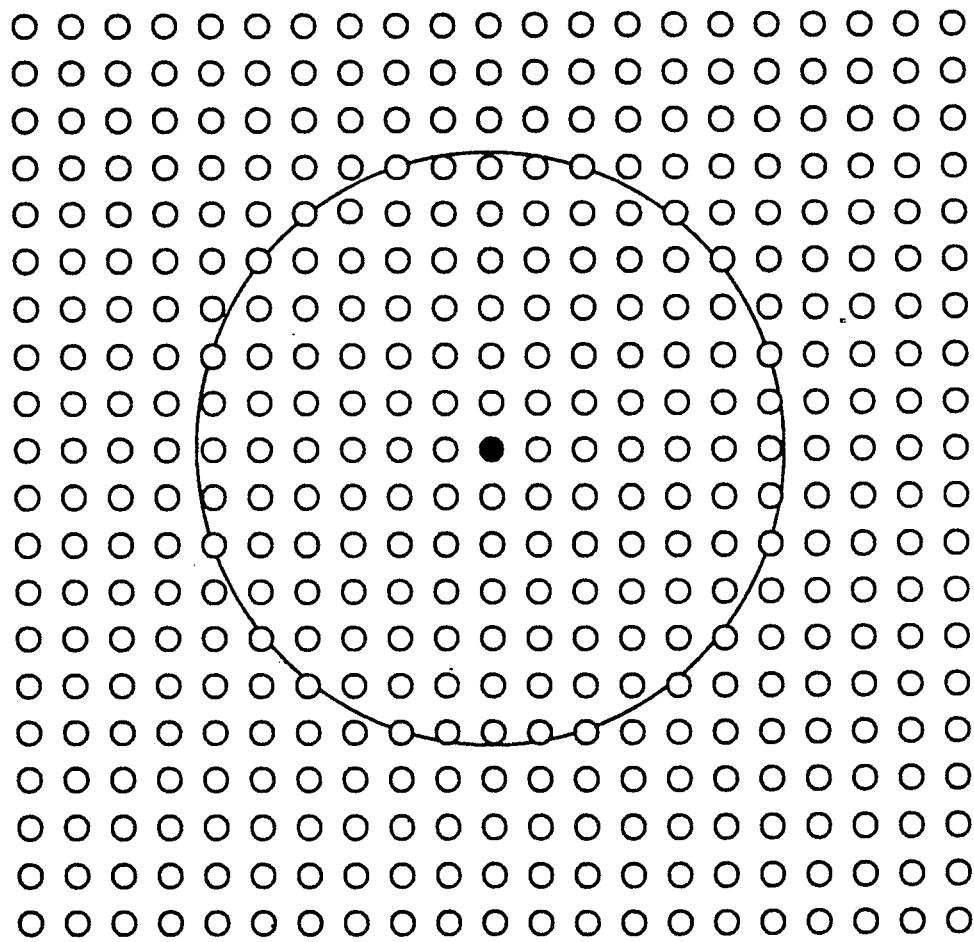
FIG. 1 is an illustration of an array of ink dot locations on a substrate.

The colors Cyan, Magenta and Yellow are referred to as CMY. Black is referred to as K (K instead of B, so as to not confuse this color with Blue). In an example of a printer useful in connection with the present invention, two pens are provided-one containing the color inks CMY and the other containing black ink. These are called the color pen and the black pen, respectively. Black printed on the page using the color pen (i.e. a combination of CMY) is called composite black or process black. Hereafter, black printed on the page using the black pen will simply be called black.

A dot (also called a pixel) is the smallest single area on the page that a pen can place ink. For example, a commercial embodiment of the invention provides for printing at a resolution of 300 Dots Per Inch (DPI) both vertically and horizontally.

The input data to a printing system, or print data, indicates where to place ink on the printed page in the form of bit-map planes. A plane conceptually is a two-dimensional array of bits corresponding to a particular a page to be printed. Each plane contains the data for one color. There may be three color planes, for example CMY, as noted above. Any desired color may be obtained by combinations of these colors. Other systems may use RGB (red-green-blue) color planes, as is common in video display systems.

Each bit in a plane represents one dot location on the page. If the bit is on (value 1), the ink for that color plane for that dot is printed. If the bit is off (value 0) nothing is printed for that color plane for that dot. Since all three color planes are frequently considered together in this specification, we shall refer to "a bit in the color planes" to mean the corresponding bits (i.e. those having the same row/col location) in all three color planes. Similarly, we will refer to a "block of data in the color planes" to mean the corresponding blocks of data in all three color planes. In some systems, input data may comprise four planes, one each for the colors CMY and one for black (K). Alternatively, the K plane may be derived from the CMY color planes as explained below.

B. Restrictions on Ink Dot Positioning

The CMY inks and K ink are mutually exclusive, i.e. a dot can have either some combination of CMY inks, or K ink, or no ink, but can never have a combination of CMY inks and K ink. Accordingly, a dot can have one and only one of the following printed on it:

1. Nothing. The dot is white or empty.
2. A combination of ink from the color pen, i.e. CM or Y but not all three. This is a color dot.
3. A combination of all three inks from the color pen, CM and Y. This is a composite black dot.
4. Ink from the black pen. This is a black dot.

C. Minimum Spacing

There is a further restriction on where the CMY and K inks can be placed on the page. Along with not being able to be on the same dot, the CMY and K inks cannot be within a predetermined minimum distance of each other. This minimum spacing requirement varies with the print environment (e.g. paper quality, temperature, humidity etc.). A useful minimum distance is two to three dots. However, the problem of how close the CMY inks can be to the K ink is complicated by the fact that, when two pens are positioned in an actual printer, they can be mis-aligned. This misalignment can extend to a distance equivalent to two to three dots. Consequently, in the preferred embodiment, the minimum separation between CMY and K (black) inks is 6 dots (or pixels). In general, the minimum spacing is referred to as delta. The actual number of dots depends upon the application.

The distance 6 dots is a linear distance, for example 1/50th of an inch (at 300 DPI), which is also used for diagonal measures. FIG. 1 illustrates an array of dot locations on a generally planar substrate such as a sheet of paper. Each dot location is represented by a small open circle, except for one dot location at which the circle is solid black. A circle about the solid black dot location illustrates a radius of six dots. For example, if the dot array represented were 300 DPI, the radius of the circle is approximately 1/50th of one inch.

If the solid black dot location represents a dot of black ink, then the circle indicates which of the surrounding dots cannot be color or composite black. Thus, any dot location that is on or within the circle cannot be printed by the color pen. Conversely, if the dot in the center of the circle represents color or composite black, then no dot that is on or within the circle should be printed with the black pen.

Figure 2:
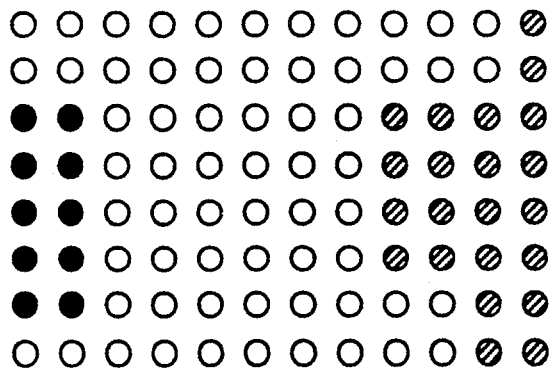
FIGS. 2–4 illustrate examples of valid configurations of ink drops applied to a substrate in which a predetermined minimum distance (delta) is maintained between each black dot and each color or composite black dot.
Figure 3:
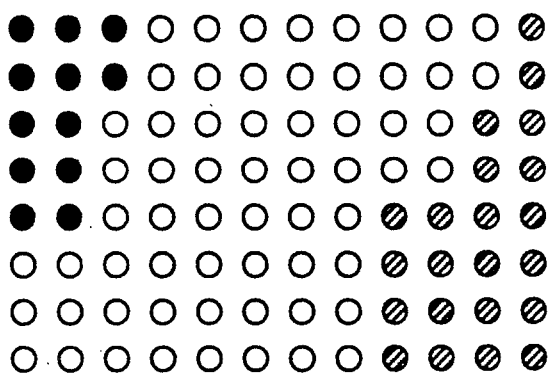
Figure 4:
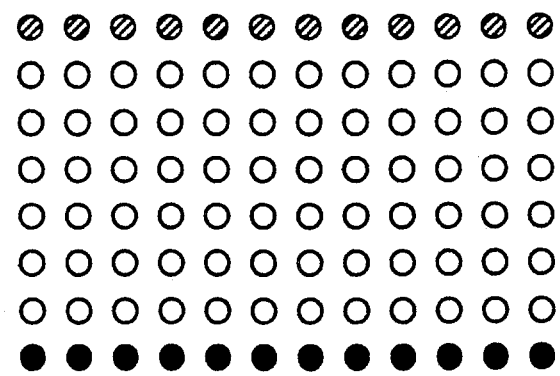

A valid configuration of dots on a page is one that has no CMY ink within delta dots of K ink. FIGS. 2 through 4 give examples of valid configurations of ink drops on a page. In these figures, solid black circles represent a black dot (K ink); shaded or hatched circles represent color or composite black dots (CMY ink); and open circles represent white dots (no ink). FIGS. 5 through 7 illustrate invalid configurations. In each of these figures, at least one CMY ink dot is within delta (here six dots) of a black dot. Where the input data to a printing system represents ink drop configurations that are invalid, i.e. that violate any of above restrictions, the data must be modified before printing in order to maintain print quality.

Since the bit plane data represent the inks that are printed on the page, the restrictions described above concerning overlapping and minimum spacing between color and black inks may conveniently be implemented by applying to the restrictions to corresponding data in the bit planes. There can, for example, be a bit turned on in the C and M planes for the same dot. There can never be a bit turned on (or left on at print time) in the K plane and any of the CM or Y planes for the corresponding dot, since this would violate the restriction that the CMY and K inks must be mutually exclusive. If the same bit is on in all three CMY planes, this represents a composite black dot. If not bit is on in any plane for a dot, this is an empty dot (white space). Lastly, to implement the minimum spacing restriction, if there is a bit turned on in the K plane, there cannot be a bit turned on in the CM or Y planes within six dots of the corresponding bit location.

D. Data Structures

The method is preferably implemented in software, though special hardware or a combination of the two may be used. Suitable code may be executed to process the print data in any convenient location. For example, it may be implemented in a "printer driver" program in a computer or in software in the printer itself. In the preferred embodiment, three major data structures are defined: the K plane, the color table and the black table. These will now be discussed in detail.

1. The K plane

The K plane, as noted before, represents where to use the black pen on the page. Each bit in the K plane represents one dot on the printed page. The K plane thus has the same dimensions as the color planes. If a bit is on in the K plane, none of the corresponding bits in the CMY planes can be on, nor can any of the CMY plane bits be on within delta of the K plane bit. The K plane is represented by reference number 60 in the diagram of FIG. 10.

2. The Color Table

The color table is a compressed representation of the CMY planes. It is important to understand the relationship between the color table and the CMY planes. Each bit in the color table represents a predetermined subset of the CMY planes. In particular, each table bit represents a contiguous, rectangular array of bits in the CMY planes called a block. To illustrate the concept, if the color planes had dimensions 50 by 100 bits, they could be divided into, for example, four equal, contiguous, rectangular arrays (blocks) of 25 by 50 bits each. In other words, each block would be a quadrant of the color planes. If each such block is represented by one bit in a color table, the color table would be two by two bits. It may be said that the color data is compressed in this illustration by a factor of 1250 (i.e. 25 by 50 bits into one bit). (There is an additional factor of three, in that three color planes (CMY) are compressed into one, for a total "compression" of 3750:1)

It is advantageous for fastest processing, however, to "compress" the color plane data in a manner based on the hardware byte size. In other words, to define a block for a particular application so as to minimize machine instruction cycles, as is familiar to those skilled in computer science. Since many processors use an 8-bit byte, each bit in the color table in a preferred embodiment represents one 8-bit by 8-bit array in the CMY planes. Ergo, the size of a block in the preferred embodiment is 8-bits by 8-bits. The individual color planes are represented by reference numbers 54, 56 and 58 in FIG. 10. The color table is 62 in the same figure.

Additionally, the block size is selected to be at least equal to the minimum spacing required between color dots and black dots. Recall that each data bit in the color and K planes corresponds to a dot location on the printed page. Thus, an 8-bit by 8-bit block size is adequate as it exceeds, in both the vertical and horizontal dimensions, the 6-dot minimum ink spacing requirement described above. So a white block between color and black blocks ensures at least the minimum spacing. For example, if the color table has a zero bit, indicating no color bits for a particular block, then it would be permissible to have black ink to one side of that block, and color ink(s) to the other side of that block, as there would be at least eight white bits in between (the intervening block). This exceeds the 6-dot delta minimum spacing requirement, while obviating the need to explicitly check each one of the intervening bits.

FIG. 8A illustrates the concept of a "combined" color plane. Such a combined plane of data may not actually be formed, but is useful here for explaining how data is processed according to the invention. The combined plane represents the logical OR function of all three (CMY) color planes, except that it excludes (i.e. indicates as zero or off) bits which are on in all three color planes. In this regard, it is not precisely the logic function: C OR M OR Y. Rather, it is the logic function: C OR M OR Y AND NOT (C AND M AND Y). Thus, if a particular bit is on in any of the three color planes, but not on in all three color planes, then the corresponding bit will be on in the combined color plane. This combined plane therefore indicates color, but not composite black. The data is partitioned to define a regular array of blocks. In the figure, there are three rows (numbered 1-3) by eight columns (numbered 1-8) in the array. Each block consists of 8 bytes of data.

FIG. 8B shows three bytes of a color table corresponding to the combined color plane of FIG. 8A. Each byte in FIG. 8B corresponds to a row in FIG. 8A; each bit corresponding to one block of data. In FIG. 8A, note for example that the 8 by 8 block for row 1, column 1 of the color plane has bits turned on (value 1), so the bit that represents that block in the color table is also turned on. Blocks in the color plane that have no bits turned on (value 0) are represented in the color table with a zero, as noted above. Even if only one bit is turned on in a block, as appears in row 3, column 2, the corresponding bit in the color table is turned on. The color table of FIG. 8B therefore indicates which blocks in the CMY color planes have color but not composite black.

3. The Black Table

The black table is a compressed representation of the K plane data. The same 8-bit by 8-bit block size is used as in the color table. Accordingly, the black table and the color table are the same size, and each bit location in each table corresponds to the same block location in the K-plane and in the color planes, respectively. FIG. 9 shows the relationship between the K plane (FIG. 9A) and the corresponding black table (FIG. 9B). The relationship is essentially the same as that described with respect to FIG. 8, bearing in mind that all three color planes (not shown individually) affect the color table, while the black table reflects solely the single K plane.

In a preferred embodiment, it is advantageous to surround both the color and black tables with an extra byte (along the top, left, right and bottom edges of the array). These extra bytes are not essential, but they simplify dealing with the special cases of conducting spacing checks (detailed below) along the table edges. Essentially, where an extra byte is provided along an edge of a table, all of the actual data can be processed as explained below, without "running out of data" along the edges of the actual data. Use of these edge or margin bytes will be apparent to those skilled in computer science in light of this specification and the accompanying drawings.

E. Building the Color Table, Black Table and initial K Plane

Figure 10:
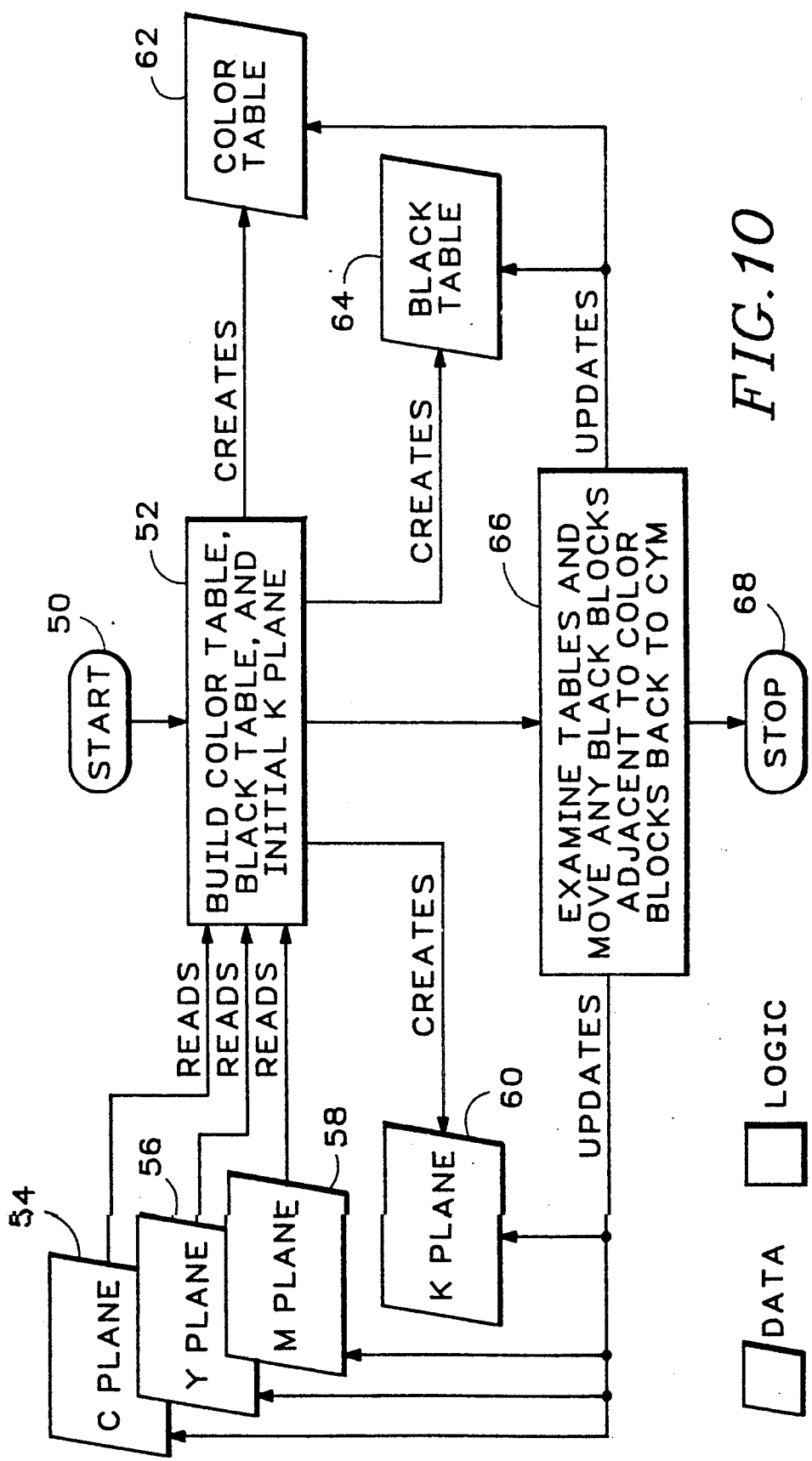
FIG. 10 is a conceptual diagram illustrating a method according to the present invention of processing CMY color data for printing by a 4-color (CMYK) liquid ink printing system so as to maximize use of black ink while maintaining a predetermined minimum spacing between black blocks and color blocks.

FIG. 10 provides an overview of the above data structures and their relationships to the principal steps in the new color separation method. The major steps, in general, are as follows. First, in step 52, is building the color and black tables that represent in a compressed format CMY and K (black) regions of the printed page. Also, building an initial K plane of data. Next, step 66, is examining the color and black tables to detect color blocks adjacent to black blocks. If such adjacency is detected, changing the adjacent black block to a color block by moving the corresponding K plane data into the color planes for printing as composite black (also part of step 66), thereby enforcing the minimum ink spacing requirements. After there are no black blocks adjacent to color blocks, processing is complete and the color separation is done, stop 68.

Initially, the CMY planes (54, 58, 56) are loaded with the image to be printed by the windowing system or application. If black is to be printed, the same bit will be on in the CM and Y planes. In step 52, the CMY planes are read and the color and black tables are created as detailed below. Also, the initial K plane 60 is created. This initial K plane is a first attempt at performing color separation, but it may be modified later. Each block will correctly be designated as being either black, color, or white. No attempt is made at this stage (step 52) to look at adjacent blocks, i.e. a color block next to a black block. Next these procedures are described in greater detail.

In building the color table, black table and initial K plane, the CMY planes are examined in 8-bit blocks. Each block will be designated as being in one (and only one) of the following three states:

1. Color. A "color block" has some combination of CM or Y inks, but not all three, on at least one pixel in the CMY planes. If one dot in the block is color, the entire block is color. A color block is indicated by a 1 or on bit in the color table.

2. Black. In a "black block," the same (corresponding) pixels are on in all three color planes. A black block is indicated by a 1 or on bit in the black table.

3. White. There are no pixels on in a white block. A "white block" is indicated by zeros or off bits in the corresponding location in both the color and black tables.

Figure 11:
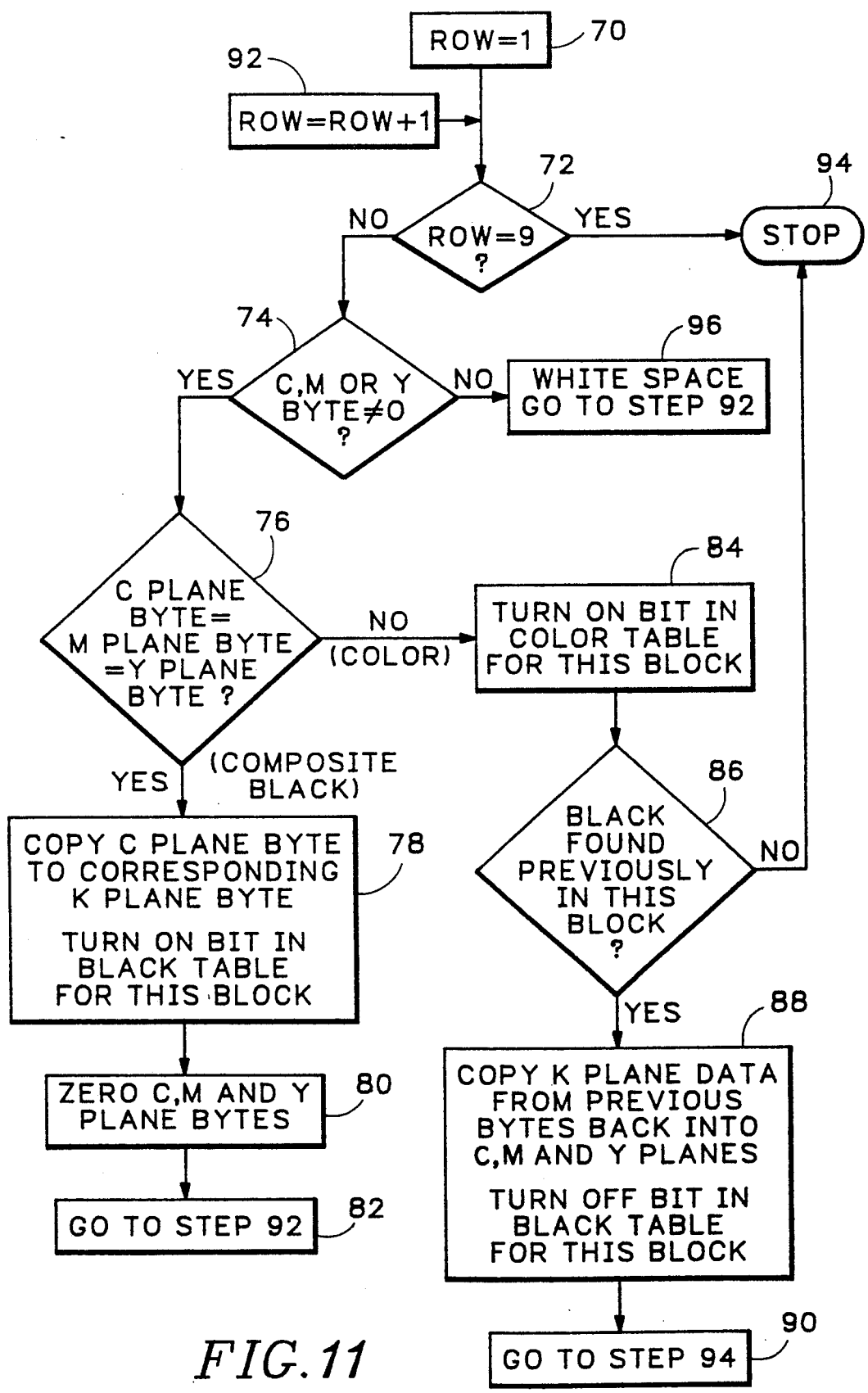
FIG. 11 is a flowchart of a process for determining whether a given block of data is color, white or black, i.e. whether a given block should be printed by the color pen or the black pen.

FIG. 11 is a flowchart of a procedure for making these state determinations to build the color and black tables. The color and black tables are initially set to all zeros. The procedure illustrated by the flowchart of FIG. 11 is performed once for each 8 by 8 block on a page. Each byte in the block is examined until it can be determined which of the three states—color, black, or white—the block is in. In this description, the block under examination is called the "current block".

Referring to FIG. 11, a variable called row indicates which byte (in the current block) is being examined. The indicated byte is referred to as the "current byte". The procedure begins at step 70 by setting row equal to 1, representing the first byte of the current block. Step 72 tests for the end of the block, given that a block has only 8 rows. Since row is not equal to 9, the method proceeds to step 74. Step 74 tests whether the C, M OR Y byte $\neq 0$. If the current byte in each of the CM and Y planes is zero, then current byte represents white space. In that case, we proceed via step 96 to the next byte in the block by incrementing row in step 92.

Alternatively, if the current byte in any of the CM or Y planes is not equal to zero, then the current byte is either a color byte or a black byte. Step 76 determines which one it is. If the C plane byte equals both the M and Y plane bytes, then this byte is composite black.

Data corresponding to the current composite black block is presently represented in the CMY planes. Step 78 copies the data from the C plane to the K plane. Because there is now data in the K plane, the corresponding bit in the black table is turned on (also in step 78). In step 80, the corresponding bytes in the CMY planes are zeroed out (cleared), since the data is now represented in the K plane. Thus, for the current byte, the data has been moved from the CMY planes to the K plane. The method next proceeds (step 82) to examine the next byte in the current block. The foregoing steps 92, 72, 74, 76, 78 and 80 are repeated as long as composite black bytes are found.

If (or when) step 76 determines that the current byte is a color byte, i.e. there are bits on in CM or Y that are not the same in all three, then the entire current block must be designated as a color block, by definition. Accordingly, in step 84, the bit in the color table that corresponds to this block is turned on. Next, in step 86, we test whether or not (e.g. by a flag) black has been detected previously within the current block. (A "black detected" flag would be cleared after each block.) Note that, if black had been found in any of the previous bytes, two things have already happened. First, the CMY data that represented black in an earlier byte was moved to the K plane and erased from the CMY planes. Second, the bit in the black table that represents the current block has already been turned on.

The earlier move of black data from the color planes into the K plane is consistent with the preference given to using black (rather than composite black) wherever possible. Now, however, we have determined that there is color within the same block. Since black is not allowed within the same block as color, we must use composite black for all black within this block. The color pen (CMY) must used to print that data.

Therefore, the next step 88 is copying data that had been determined to be black in the previous bytes from the K plane back into the CMY planes. Also, step 88 turns off the bit in the black table that represents this block. Once color has been found, the process is complete for the current block (step 94). If a block has no data in the CMY planes, the procedure will loop through steps 72, 74, 96, 92 and find nothing.

After the procedure illustrated in FIG. 11 has been applied to each block in the CMY planes, each block has been designated as color, black or white. If a block is color, the corresponding bit is on in the color table only. For black, the corresponding bit is on in the black table only. For white, the corresponding bits are off in both the color and black tables. Now that the state of each block of data has been correctly determined and entered in a table, those tables can be used advantageously for further processing the data at high speed.

F. Examining the Data to Detect Spacing Violations

The next step, according to the invention, is to examine each color block, and determine if there are any black blocks adjacent to it. If there is no black block adjacent a color block, then the data does not call for printing black ink within one block (i.e. within eight dots or pixels) of color ink. This criterion more that satisfies the six-dot minimum spacing required to avoid adversely affecting the inks on the printed page.

An adjacent black block can occur in any one of 8 surrounding locations relative to the color block; namely, to either side (in the same row), above or below (in the same column), or diagonally adjacent (i.e. offset by one row and one column in any of the four diagonal directions). The blocks of data are examined implicity by examining the corresponding tables, where each block is represented by a single bit. Referring now to FIG. 12A, a color table, one bit is turned on. FIG. 12B identifies the surrounding bits, represented by 1's, that must be checked in the black table. If any one of the surrounding bits in the black table is on or a 1, it signifies that there is a black block adjacent to a color block. Thus, the color and black tables can be used to quickly determine where color blocks are adjacent to black blocks.

It would be excessively time consuming, however, to examine each bit in the color table to determine which bits are turned on, and then identify what surrounding bits to look at in the black table, and then examine each of those surrounding bits explicitly. A faster method of determining when a color block is adjacent to a black block calls for examining bytes instead of bits in the color and black tables, as follows.

1. Using Neighbor Bytes

Note that in FIG. 12, for a given 1 bit in the color table, three bits above and three bits below must be checked in the black table. Additionally, the two bits immediately left and right of the corresponding color bit must be checked in the black table. This can be done quickly and efficiently using "masks" as follows. The first step, for a given 1 bit in the color table (a "color bit"), is turning on its neighbor bits to the left and to the right of the color bit. This is called "smearing" the color bit. We call the resulting byte a neighbor byte. The next step is logically ANDing the neighbor byte with each byte in the black table that is located in the same column in the row above, the same row, and the row below the current byte in the color table. The result of each ANDing operation is called a mask. For each such AND operation, if the resulting mask is a value not equal to zero, it indicates that there is a 1 or on bit in the black table (a "black bit") located adjacent the location that corresponds to the color bit. Each such black bit represents a black block adjacent the color block represented by the color bit.

This technique is illustrated in FIG. 13. FIG. 13A shows an excerpt from a color table, having a byte (in the second row) with two bits on. FIG. 13B shows the same color table with the left and right neighbor bits turned on (the neighbor byte). FIG. 13C shows the corresponding bytes in an exemplary black table. Finally, FIG. 13D shows the resulting mask after logically ANDing each byte in the black table of FIG. 13C with the neighbor byte of FIG. 13B.

The step of creating a neighbor byte (see FIG. 13B) can be implemented at very high speed as follows. For each byte in the color table there are 256 possible combinations of bits, and there are 256 corresponding patterns of bits (or neighbor bytes) after the neighbor bits have been turned on. These neighbor bytes can be precomputed and stored in an array (called neighborarray) having 256 entries. Each time the process detects one or more bits on in a color table byte, that color table byte can be used as an index into the neighbor byte array to look up the corresponding neighbor byte. This lookup procedure is represented by step 98 in FIG. 15, in which the neighbor byte array is called neighborarray.

Figure 15:
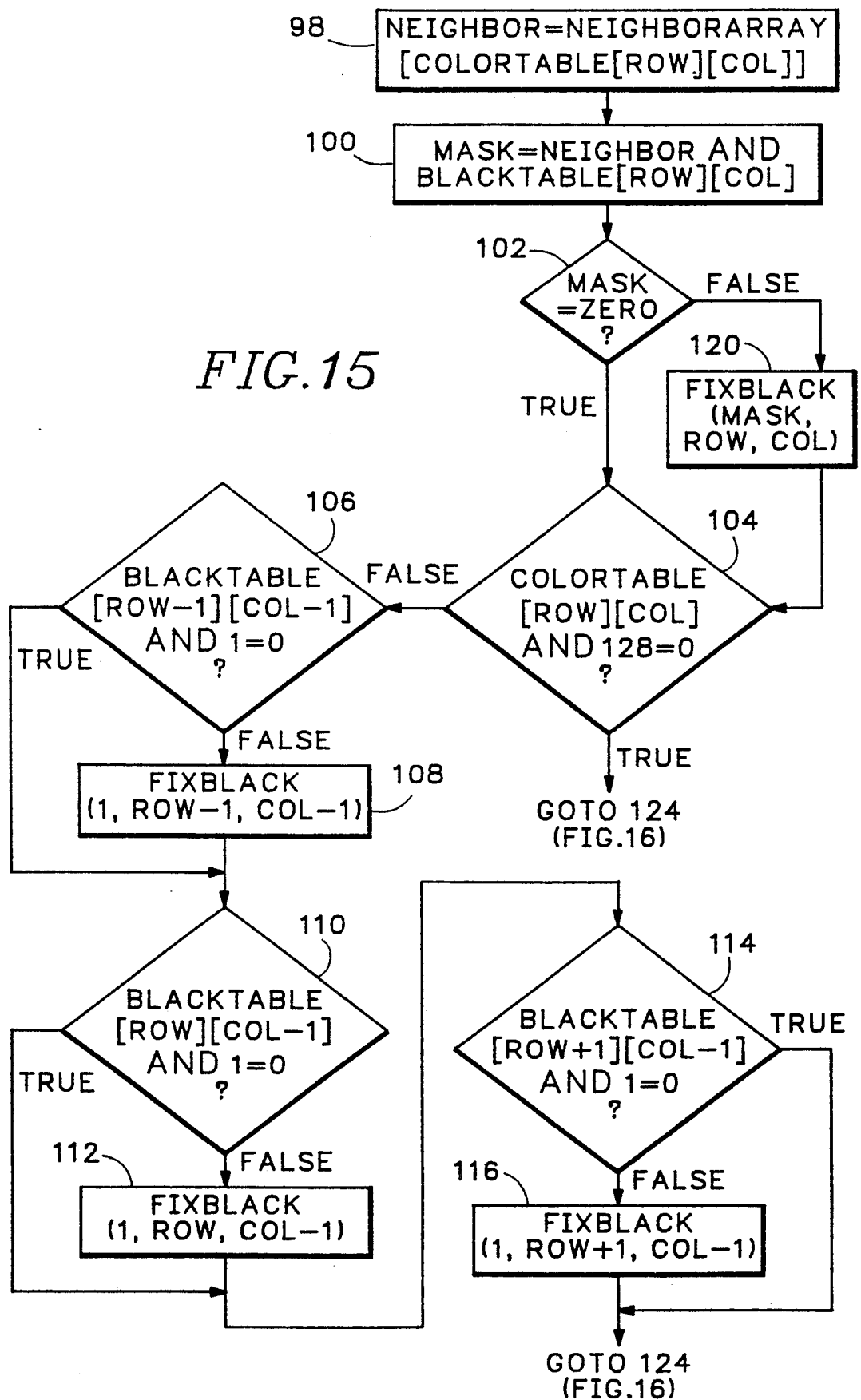
FIGS. 15-17 show a flowchart of a method of examining the color table and black table to detect black blocks which are adjacent to color blocks.

Referring now to FIG. 15, the first step 98 is to fetch the neighbor byte for the current color table byte. A variable (called neighbor) is loaded with the appropriate neighbor byte from the look-up table (neighborarray) specified by the current byte (colortable[row][col]). This variable (neighbor) will be used to quickly determine whether there are any black blocks adjacent to the color blocks represented by the current byte in the color table. Specifically, in step 100, neighbor is logically ANDed with the black table byte in the same row/column location (blackTable[row][col]) to see if there are color blocks adjacent to black blocks. The result byte is called mask.

The next step 102 is testing to determine whether the mask resulting from the previous AND operation is equal to zero. If it is not (false), then there are color blocks adjacent to black blocks. Each on bit (1) in the resulting mask indicates an on bit in the black table byte adjacent the corresponding bit in the color table. (Note that each bit in the black table byte that corresponds to an on (1) bit in the color table byte is necessarily off (0) as black table bits and color table bits are mutually exclusive.) This is corrected, step 120, by calling a function called fixBlack, described in detail below. Briefly, fixBlack is a procedure that, for a given mask pattern and row/column pair in the color/black tables, moves the corresponding block of K plane data back into the CMY planes. For each block moved, the corresponding black table bit is turned off and the corresponding color table bit is turned on.

2. Special case-Leftmost Bit in Color Table Byte

The above technique does not address the case in which the "neighbor" bits to be examined in the black table are in a different byte to the left or right. In other words, when the color table bit of interest (a "1") is at either end of the byte, three of the neighbor bits in the black table are in a neighboring byte (adjacent the corresponding byte) and must be inspected explicitly. Thus, if the leftmost bit of a color table byte is on, then the rightmost bit of the black table bytes to the left of, upper left of, and lower left of the corresponding byte in the black table must be checked. Similarly, if the rightmost bit of a color table byte is on, then the leftmost bit of the black table bytes to the right of, upper right of, and lower right of the corresponding byte in the black table must be checked explicity. FIG. 14 illustrates this relationship.

Referring now to FIG. 14, FIG. 14A shows a color table in which the leftmost bit of a byte is on. FIG. 14B shows the corresponding portion of a black table, in which the bits indicated with a "1" and numbered 200, 202 and 204 must be checked to see if the corresponding blocks contain black. FIG. 14C shows another color table in which the rightmost bit of a byte is on. FIG. 14D shows the corresponding portion of a black table, in which the bits indicated with a "1" and numbered 206, 208 and 210 must be checked to see if the corresponding blocks contain black. Accordingly, a procedure for checking adjacent bits must be able to cross byte boundaries in these special cases.

In general, if any bit is on in a color table byte, it is necessary to detect every occurrence of a black table bit that is on adjacent the bit location in the black table that corresponds to the on color table bit. FIG. 15 is a flowchart of a procedure (called findBlack) for this purpose. findBlack is passed the address, i.e. the row and column indexes, of the byte in the color table that has at least one bit on (the current byte). It is located at colortable[row][col].

Figure 16:
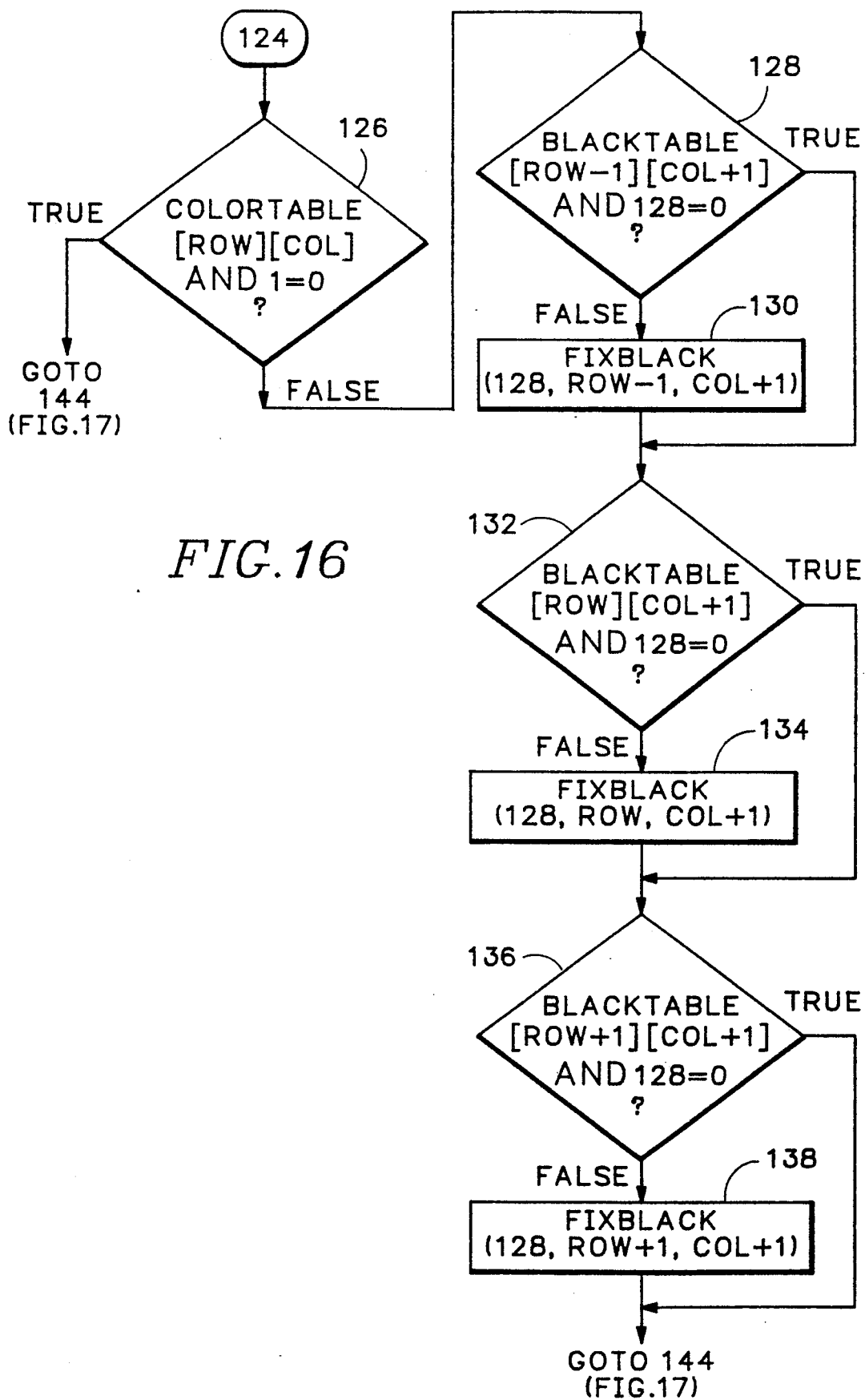

If step 102 result is True, there is no conflicting bit in the black table within the current byte. However, it remains to check for the special cases noted above. First, step 104, is determining whether the leftmost bit in the current color table byte is on. This is conveniently (and quickly) done by logically ANDing the current byte (colortable [row][col]) with the number 128 and checking for zero-step 104. If the leftmost bit is not on (step 104=True), then checks of all three bytes in the black table to the (above, same row, and below) can be skipped, so control passes to 124 (FIG. 16). If the result of step 104 is False, then the leftmost bit of the current (color table) byte is on. Therefore, it remains to examine adjacent black table bytes to the left, as follows.

In step 106, the indexes for the black table are [row−1] and [column−1]. This location corresponds to bit 200 in FIG. 14B. This byte in the blacktable is ANDed with the number 1 and the result checked for zero in step 106. In other words, the "mask" is a binary one, which is a byte with only the rightmost bit turned on. If the result of step 106 is False, the rightmost bit of this black table byte is on, adjacent to (above and left of) the leftmost bit of the color table byte. Accordingly, in step 108, fixBlack is called to move the corresponding black block to the CMY planes. If the result is True, the rightmost bit of this black table byte is off (zero), and we proceed to step 110 directly without calling fixBlack.

Next, in step 110, the black table byte at [row], [column−1] is examined. This location corresponds to bit 202 in FIG. 14B. If the rightmost bit of that byte is on, i.e. step 110 result=False, the rightmost bit of this black table byte is on, adjacent to (left of) the leftmost bit of the color table byte. Accordingly, in step 112, fixBlack is called to move the corresponding black block to the CMY planes. If the result is True, the rightmost bit of this black table byte is off (zero), and we proceed to step 114 directly without calling fixBlack.

Finally, in step 114, the black table byte at [row+1], [column−1] is examined. This location corresponds to bit 204 in FIG. 14B. If the rightmost bit of that byte is on, i.e. step 114 result=False, the rightmost bit of this black table byte is on, adjacent to (below and left of) the leftmost bit of the color table byte. Accordingly, in step 116, fixBlack is called to move the corresponding black block to the CMY planes. If the result is True, the rightmost bit of this black table byte is off (zero), and we proceed to step 124 (FIG. 16) directly without calling fixBlack.

At this point, for the current color table byte, the same byte in the black table has been checked, and if necessary, the three bytes to the left have been checked. What is left to do is check the bytes above, below and to the right of this color table byte.

3. Special case-Rightmost Bit in Color Table Byte

Figure 17:
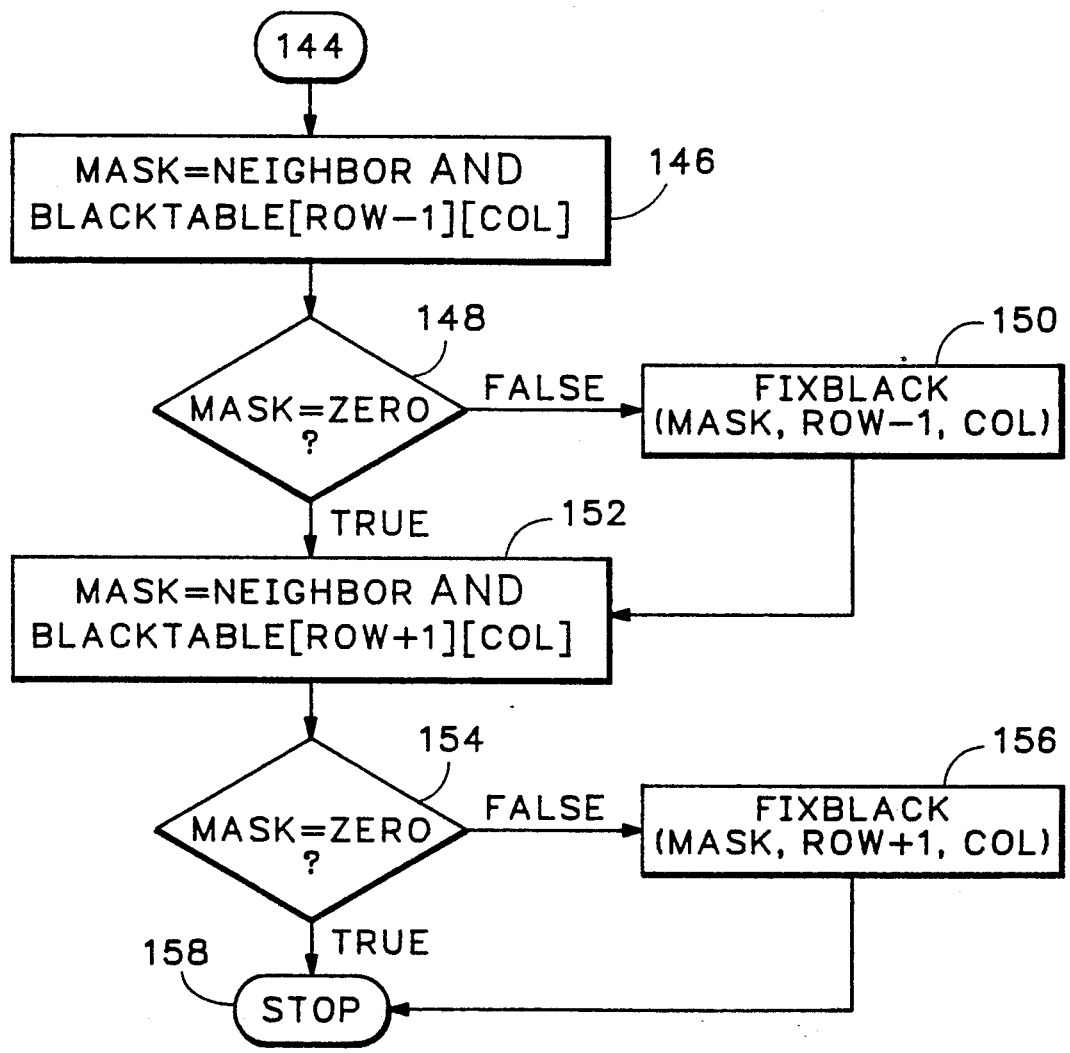

Referring now to FIG. 16, refer to label 124. The first step 126 is to examine the rightmost bit of the current color table byte. This is done by logically ANDing the byte with the binary number 1 and testing the resulting byte for zero-step 126. If the rightmost bit is on, result=False, each of the three adjacent bytes to the right in the black table must be checked to see if the leftmost bit is turned on. This process corresponds to checking bits 206, 208 and 210 in FIG. 14D. If the rightmost bit of the color table is not on, result=True, these checks can be skipped, so go to label 144 (FIG. 17).

Each of these bytes is checked in turn, in step 128 (above and to the right); step 132 (same row-to the right); and step 136 (below and to the right). The procedure is similar to that employed for checking bytes to the left side, described above, so detail may be omitted. Note however that in FIG. 16 the adjacent bytes are ANDed with the number 128 so as to detect the leftmost bit in the blacktable byte, whereas the mask used in FIG. 15 was the number 1 to detect the rightmost bit. After checking each black table byte, the fixBlack procedure is called, as described above, to move data as necessary.

4. Testing Bytes Above and Below the Current Byte

Lastly, the bytes above and below must be checked. More precisely, it remains to examine the black table bytes above and below the black table location corresponding to the current color table byte. Referring now to FIG. 17, start at label 144. In the first step 146, mask is set to the value of neighbor logically ANDed with the byte from the black table above the color table byte. Thus, the black table index is set to [row−1][col]. Recall that the value neighbor corresponds, for example, to the byte shown in FIG. 13B. It is the current color table byte with neighbor bits turned on. If the corresponding black table bytes are as shown in FIG. 13C, the results after ANDing each black table byte with the neighbor byte are as shown in FIG. 13D.

The next step 148 checks to see if the resulting value is equal to zero. If it is not equal to zero (False), there are black blocks adjacent to color blocks, and fixBlack is called with the appropriate values in step 150. The next step is to examine the black table byte below the color table byte. If the result of step 148 is True, we proceed to the next test without calling fixblack in step 150.

The next step 152 is to set mask to the value of neighbor ANDed with the byte from the black table below the color table byte. Thus, the black table index is set to [row+1][col]. Step 154 checks to see if the resulting value is equal to zero. If mask is not equal to zero (False), there are black blocks adjacent to color blocks, and in step 156 fixBlack is called to correct the violation. If mask is equal to zero (True), the process is completed and stops 158.

At this point, for the current color byte only, the method has checked all possible surrounding bits in the black table. For any black block adjacent to a color block, that black block was moved from the K plane back to the CMY planes, and the color and black tables updated accordingly. The foregoing procedures illustrated in FIGS. 15-17 are repeated for each byte in the color table that has any bits on. In other words, they are carried out for all blocks in the color table that have at least one bit on.

G. Moving data from the K plane to CMY planes (fixBlack)

Figure 18:
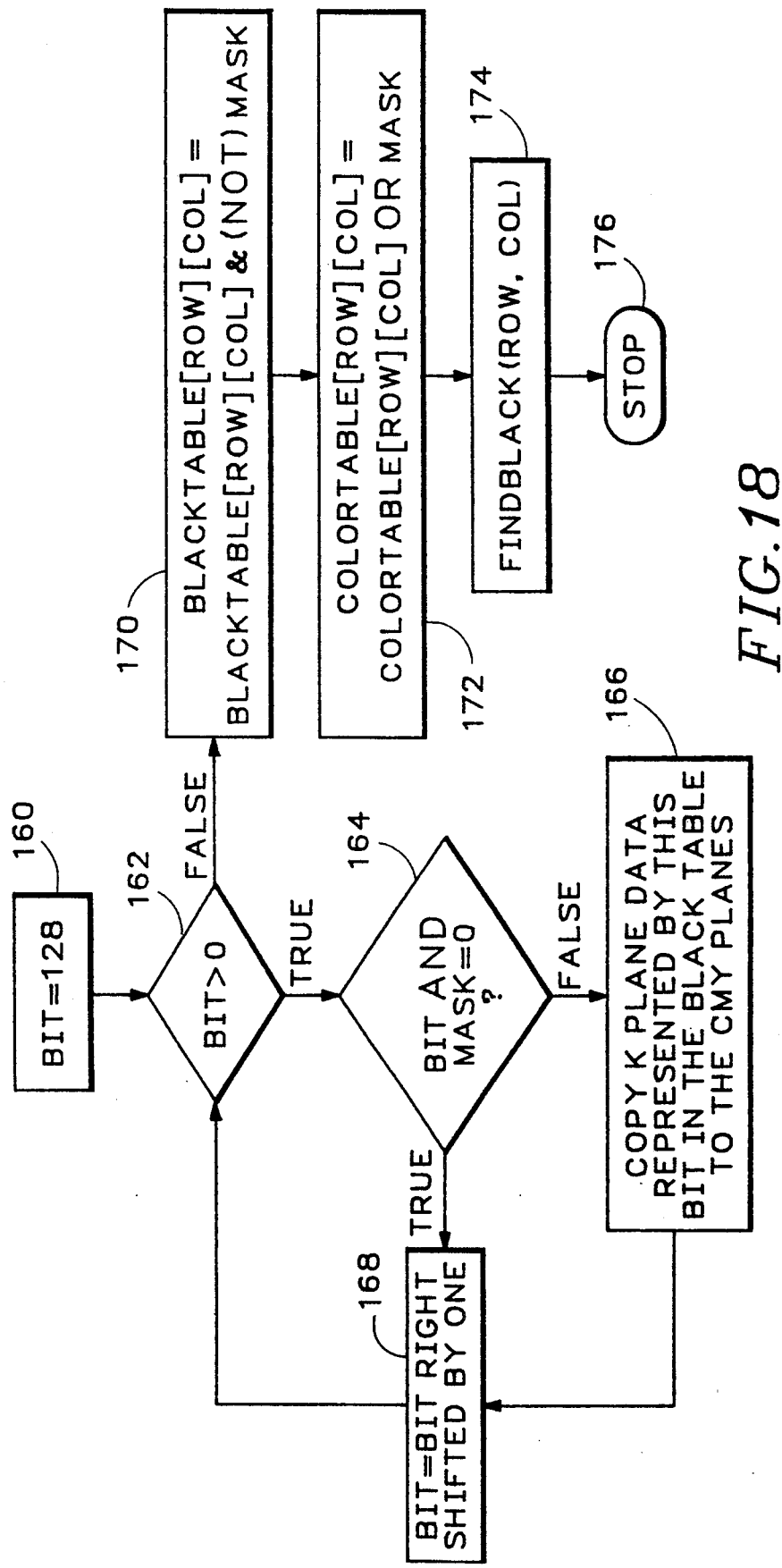
FIG. 18 is a flowchart of a method of moving selected data into the color planes from the black plane in order to correct minimum spacing violations.

A preferred method of moving data from the black K plane back into the CMY color planes is arbitrarily called fixblack, as noted above. This method is illustrated in the flowchart of FIG. 18. The function fixBlack is passed three data-mask, row and col (column). Row and column are the address or index of the current byte. fixblack is called when that byte in the color and black tables represents black adjacent to color. The mask, itself a byte, indicates (by a 1) which bit in the current byte represents the black block to be moved. More than one bit may be on in the mask.

Referring to FIG. 18, in the first step 160, a value called bit is initialized to 128, the leftmost bit of a byte. The bit will be shifted to the right, and at each shift, will be used to see if the same bit is on in the mask. If so, then this is a block that must be moved from the K plane to the CMY planes. Step 162 checks that the value of bit is still greater than zero. If so, bit is ANDed with the mask in step 164. If the result is not equal to zero (False), then in step 166 the K plane data represented by this bit in the black table is moved to the CMY planes. Next, in step 168, the bit value is shifted right by one, and the testing continues for the rest of the byte.

After each of the eight bits in the mask are tested, the black and color tables must be updated. In step 170, the black table byte is replaced by itself logically ANDed with the binary complement of mask. In computer shorthand:

blackTable[row][col]=blackTable[row][col]AND NOT mask

This step turns off the mask bits in the black table. Next, in step 172, the color table byte is ORd with the mask, thereby turning on the mask bits in the color table.

Importantly, for the current byte in the color table, there are now new entries. The corresponding new color blocks might be adjacent to existing black blocks, which would violate the minimum spacing requirements. Therefore, in step 174, findBlack must be called (again) for the current row/column. findBlack refers to the procedures for finding and correcting adjacency violations, detailed above with reference to the flowchart of FIGS. 15-17. The methods called findBlack and fixBlack may be arranged to operate recursively, though that is not essential. The specific implementation is a matter of design choice, as long as processing continues until all minimum spacing violations are detected and corrected. Is some cases, as shown below, changing data can "propagate" over an entire page.

H. Example Illustrating Operation of the Invention

Figures 19A, 19B, 19C:
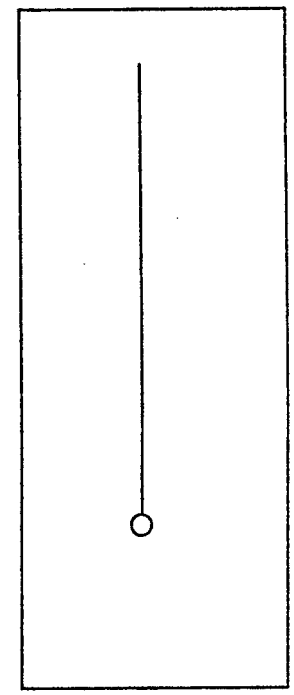

FIGS. 19-21 illustrate an example of operation of the invention. FIG. 19C illustrates a graphics image. In that image, the vertical line is to be printed black. At the lower end of the vertical line is a circle indicating color ink. The black line thus abuts the color ink. In CMY color plane data, the black line would be represented as composite black, and the circle as the desired color.

Initially, all of the composite black data is moved out of the color planes and into a K plane for printing as true black. FIG. 19A shows the contents of a black table and FIG. 19B shows the contents of a color table after this initial processing has been completed. Only a single bit remains on in the color table (row 12), indicating the color ink (the circle) in the image of FIG. 19C. A series of 1's in the black table now represent the vertical black line in the image. The initial table building corresponding to step 52 in FIG. 10 has been completed.

The next step is to examine these tables to detect black adjacent color and make any necessary corrections. When the sole color bit is examined, the method will detect an adjacent black bit, namely the black bit directly above the black table location that corresponds to the color bit. Specifically, in step 146 (FIG. 17), mask=0011 1000 (neighbor) AND 0001 0000 (blackTable [row−1][col]). The result is 0001 0000, so step 148 (mask=zero?) result is False. Accordingly, in step 150, fixBlack is called to correct the minimum spacing violation. fixBlack is passed the mask to identify the offending table bit, and the table row and column locations. In this example, fixBlack receives the parameters: 0001 0000 (mask), 11 (row eleven), 1 (column 1—only one column in the example). fixBlack moves the corresponding block of data from the K plane back into the color planes, and updates the black and color tables accordingly (see FIG. 18). As a consequence, the bit directly above the color bit in FIG. 19B is turned on. And the corresponding bit in the black table is turned off.

Next findBlack is called, i.e. the procedure of FIGS. 15-17, to check the black table bits surrounding the new color table bit (in row 11) to detect black adjacent color once again. The black table bit in row 11 is now off, and is not at issue. But the black table bit in row 10 is detected as being adjacent the color table bit in row 11. Therefore, as before, the corresponding block of data is moved from the K plane back into the color planes. The tables are updated, i.e. the color table bit in row 10 is turned on, and the black table bit in row 10 is turned off.

Figures 20A, 20B, 20C:
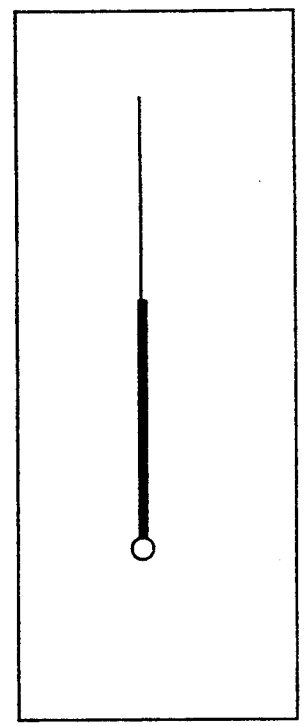

Once again the current color table bit, now row 10, is examined to detect adjacent black bits in the black table. The black bit in row 9 will be detected and, as before, the corresponding block of data moved from the K plane back into the color planes. It may be seen that the foregoing steps are repeated, each cycle moving a block of data from the K plane back into the color planes. After five cycles, the data are as illustrated in FIG. 20A (black table) and FIG. 20B (color table). The data shown in the tables of FIG. 20 is represented by the image of FIG. 20C. Referring to FIG. 20C, the heavy (lower) portion of the vertical line represents composite black, while the finer (upper) portion of the line represents true black. This illustrates graphically how the composite black is "propagating" up from the color region.

Note that, at this point in the process, a violation of the minimum spacing requirement still exists where the composite black touches black, since composite black is composed of color ink. Referring to the tables of FIG. 20, it may be seen that the color bit in row 7 is adjacent (below) a black bit in the same position in row 6. Accordingly, the foregoing process continues until all of the black data has been converted back into composite black data. The final result appears in the tables of FIG. 21A (black table) and FIG. 21B (color table). The data shown in the tables of FIG. 21 is represented by the image of FIG. 21C. In that image, no black ink is printed adjacent color ink. It may be observed, in this example, that correction of an initial adjacency violation resulted in a new violation, correction of which resulted in yet another new violation, etc., so that the correction "propagated" over the entire image.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

We claim:

1. In a printing system having sources of black ink and color inks, a method of printing for improved color separation comprising the steps of:
   receiving bit-map color graphics input data (54,56,58);
   separating the input data to form composite black data and color data (FIG. 11);
   designating the composite black data as true black data for printing in black ink;
   examining the true black data and the color data (FIG. 15) to detect data that represents black dots within a predetermined minimum spacing from color dots (FIGS. 1-7);
   re-designating detected black data as composite black data (66) for printing in color ink;
   repeating said examining and re-designating steps until no black dots are detected within the predetermined minimum spacing from color dots;
   printing the true black data using black ink; and
   printing the color data, including composite black data, using color ink, thereby maintaining at least the minimum spacing between black dots and color dots on a printed page.

2. A method according to claim 1 wherein:
   said examining step includes:
   selecting a block size equal to at least the minimum spacing in both verical and horizontal dimensions;
   partitioning the input data to define a series of blocks of the selected block size (FIG. 8);
   designating each one of the series of blocks as one of color, black or white (FIG. 11); and
   examining the block designations to detect black blocks adjacent color blocks;
   said re-designating step includes re-designating detected black blocks as color blocks; color blocks;
   said repeating step includes repeating said examining and re-designating steps until no black blocks are detected adjacent color blocks, thereby ensuring at least the minimum spacing between color data and black data; and
   said printing steps include printing the black blocks using black ink and printing the color blocks using color inks.

3. A method according to claim 2 wherein the step of designating the blocks includes:
   building a color table (62) having a series of bits, each color table bit corresponding to a respective one of the color plane blocks (FIG. 8) and indicating whether or not the corresponding color plane block is a color block (FIG. 11); and
   building a black table (64) having a series of bits, each black table bit corresponding to a respective one of the K plane blocks (FIG. 9) and indicating whether or not the corresponding K plane block is a black block (FIG. 11).

4. A method according to claim 3 wherein examining adjacent bits in the black table includes:
   testing a corresponding black table byte (100,102) to detect an indication of a black block to the left or right of the bit in the color table byte that indicates a color block, thereby detecting a black block adjacent the color block;
   testing a black table byte above the corresponding black table byte (146,148) to detect an indication of a black block above the bit in the color table byte that indicates a color block, thereby detecting a black block adjacent the color block; and
   testing a black table byte below the corresponding black table byte (152,154) to detect an indication of a black block below the bit in the color table byte that indicates a color block, thereby detecting a black block adjacent the color block.

5. A method according to claim 3 wherein examining adjacent bits in the black table includes:
   forming a neighbor byte for the current color table byte (98);
   logically ANDing the neighbor byte together with the corresponding byte in the black table (100) to form a mask;
   testing the mask for zero (102); and
   if the mask is not equal to zero, indicating that there is a black block adjacent to a color block (120).

6. A method according to claim 5 wherein said forming a neighbor byte includes:
   determining every possible bit combination for a color table byte;
   computing a corresponding neighbor byte for each determined bit combination (FIG. 13B);
   storing the computed neighbor bytes indexed by the bit combinations; and
   accessing the stored neighbor byte by the corresponding color table byte.

7. A method of compressing color planes of bit-map color graphics data for high speed color separation comprising the steps of:
   forming a K plane having the same dimensions as the color planes (52);
   moving composite black data out of the color planes and into the K plane; partitioning the color planes to define an array of blocks of color data (FIG. 8);
   building a color table (62) having a series of bits, each color table bit corresponding to a respective one of the color plane blocks and indicating whether or not the corresponding color plane block is a color block (FIG. 11);

partitioning the K plane in the same manner as said partitioning the color planes, to define an array of blocks of K plane data (FIG. 9); and building a black table (64) having a series of bits, each black table bit corresponding to a respective one of the K plane blocks and indicating whether or not the corresponding K plane block is a black block (FIG. 11); thereby allowing high speed examination of the graphics data by examining the color table and the black table.

8. A method according to claim 7 wherein each block of data consists of an 8-bit by 8-bit array.

9. A method of processing bit-map color graphics data for improved color separation comprising the steps of:

receiving a page of bit-map color graphics input data defining at least three (CMY) color planes (54,58,56);

if the input data does not include a K (black) plane, defining a K plane having the same dimensions as the color planes (60) so that each location in the K plane corresponds to a respective location in the color planes;

examining the color planes to detect composite black bits (52);

moving detected composite black bits from the color planes into the K plane (52), thereby changing the composite black bits to black bits for printing by a source of black ink;

examining the color planes and the K plane to detect black bits located within a predetermined minimum spacing from color bits (66); and moving detected black bits from the K plane back into the color planes (66), thereby changing said black bits back into composite black bits for printing by a source of color inks to avoid printing black ink within the minimum spacing from color ink.

10. A method according to claim 9 wherein examining the color planes includes combining the color planes to form a combined color plane (FIG. 8A) having a series of bits, each bit corresponding to a respective location in the three color planes and indicating whether or not the corresponding color plane locations have color but not composite black.

11. A method according to claim 9 wherein the step of examining the color planes and the K plane includes the steps of:

partitioning the color planes to define an array of blocks of color data;

building a color table (62) having a series of bits, each color table bit corresponding to a respective one of the color plane blocks and indicating whether or not the corresponding color plane block is a color block (FIG. 11);

partitioning the K plane in the same manner as said partitioning the color planes, to define an array of blocks of K plane data;

building a black table (64) having a series of bits, each black table bit corresponding to a respective one of the K plane blocks and indicating whether or not the corresponding K plane block is a black block (FIG. 11);

for each bit in the color table that indicates a color block, examining a predetermined set of bits in the black table located adjacent a corresponding bit in the black table (FIG. 15) to detect bits that indicate a black block; and identifying each such adjacent black table bit which indicates a black block.

12. A method according to claim 11 further comprising the steps of:

for each identified black table bit, moving the corresponding block of data from the K plane into the color planes (166–FIG. 18);

updating the color table (172) and updating the black table (170) to reflect said moving step, thereby defining new entries in the color table and in the black table;

repeating said examining adjacent bits in the black table (174) to ensure that the new entries in the color table are not adjacent black bits; and repeating said moving, updating and examining and indentifying steps until no minimum spacing violations are detected.

13. A method according to claim 12 wherein each block consists of 8 bytes of 8 bits per byte and said moving and updating steps are carried out recursively (174) with respect to said examining and indentify steps (FIGS. 15-17).

14. A method according to claim 11 wherein building the color table and the black table includes, for each block in the page:

initializing the color table to all zero;

initializing the black table to all zeros; and for each byte in the block (70,72);

testing the corresponding bytes in the color planes to detect whether or not all the said bytes are equal to zero (74);

if the said color plane bytes are not all equal to zero, testing the said color plane bytes to determine whether the byte is color or composite black (76);

if the byte is composite black, moving the corresponding byte from the color planes into the K plane (78); and turning on a bit in the black table that corresponds to the current block (78), thereby indicating that the current block is a black block.

15. A method according to claim 14 further comprising the steps of:

if the byte is color, turning on a bit in the color table that corresponds to the current block (84), thereby indicating that the current block is a color block;

testing whether or not a composite black byte has been detected previously within the current block (86); and if a composite black byte had been detected previously, copying the K plane data from said previously detected byte back into the color planes and turning off a bit in the black table that corresponds to the current block.

16. A method according to claim 11 wherein said examining the set of adjacent bits in the black table includes:

testing a corresponding black table byte to detect an indication of a black block to the left or right of the bit in the color table byte that indicates a color block, thereby detecting a black block adjacent the color block;

testing a black table byte above the corresponding black table byte (146,148) to detect an indication of a black block above the bit in the color table byte that indicates a color block, thereby detecting a black block adjacent the color block; and testing a black table byte below the corresponding black table byte (152,154) to detect an indication of a black block below the bit in the color table byte that indicates a color block, thereby detecting a black block adjacent the color block.

17. A method according to claim 11 wherein examining adjacent bits in the black table includes:

forming a neighbor byte for the current color table byte (98);

logically ANDing the neighbor byte together with the corresponding byte in the black table (100) to form a mask;

testing the mask for zero (102);

if the mask is not equal to zero, indicating that there is a black block adjacent to a color block (120).

18. A method according to claim 11 further comprising:

logically ANDing the current color table byte together with a predetermined binary constant having a leftmost bit turned on and testing the result for zero (104), thereby testing whether the leftmost bit of the color table byte is on; and if the leftmost bit of the color table byte is on, checking the rightmost bits of black table bytes to the left of the black table byte that corresponds to the color table byte (106–116);

logically ANDing the color table byte together with a predetermined binary constant having a rightmost bit turned on and testing the result for zero (126), thereby testing whether the rightmost bit of the color table byte is on; and if the rightmost bit of the color table byte is on, checking the leftmost bits of black table bytes to the right of the black table byte that corresponds to the color table byte (128–138).

19. A method according to claim 17 wherein checking the rightmost bits of black table bytes includes the steps of:

logically ANDing a black table byte above and to the left of the color table byte together with a predetermined binary constant having a rightmost bit turned on and testing the result for zero (106), thereby checking whether the rightmost bit of the said black table byte is on;

if the rightmost bit of the said black table byte is on, moving the corresponding block of data from the K plane into the color planes (108);

logically ANDing a black table byte to the left of the color table byte together with a predetermined binary constant having a rightmost bit turned on and testing the result for zero (110), thereby checking whether the rightmost bit of the said black table byte is on;

if the rightmost bit of the said black table byte is on, moving the corresponding block of data from the K plane into the color planes (112);

logically ANDing a black table byte below and to the left of the color table byte together with a predetermined binary constant having a rightmost bit turned on and testing the result for zero (114), thereby checking whether the rightmost bit of the said black table byte is on; and if the rightmost bit of the said black table byte is on, moving the corresponding block of data from the K plane into the color planes (116).

20. A method according to claim 17 wherein checking the leftmost bits of black table bytes includes the steps of:

logically ANDing a black table byte above and to the right of the color table byte together with a predetermined binary constant having a leftmost bit turned on and testing the result for zero (128), thereby checking whether the leftmost bit of the said black table byte is on;

if the leftmost bit of the said black table byte is on, moving the corresponding block of data from the K plane into the color planes (130);

logically ANDing a black table byte to the right of the color table byte together with a predetermined binary constant having a leftmost bit turned on and testing the result for zero (132), thereby checking whether the leftmost bit of the said black table byte is on;

if the leftmost bit of the said black byte is on, moving the corresponding block of data from the K plane into the color planes (134);

logically ANDing a black table byte below and to the right of the color table byte together with a predetermined binary constant having a leftmost bit turned on and testing the result for zero (136), thereby checking whether the leftmost bit of the said black table byte is on; and if the leftmost bit of the said black table byte is on, moving the corresponding block of data from the K plane into the color planes (138).

* * * * *